(No Model.) 3 Sheets—Sheet 1.

A. J. SIMPSON.
GRAIN MEASURING APPARATUS.

No. 377,278. Patented Jan. 31, 1888.

Witnesses.
Robert Everett,
Dennis Sumby.

Inventor:
Andrew J. Simpson.
By James L. Norris.
Atty.

N. PETERS. Photo-Lithographer, Washington, D. C.

(No Model.) 3 Sheets—Sheet 2.

A. J. SIMPSON.
GRAIN MEASURING APPARATUS.

No. 377,278. Patented Jan. 31, 1888.

Witnesses,
Robert Enritt,
Dennis Sumby.

Inventor
Andrew J. Simpson,
By James L. Norris,
Atty.

(No Model.)  3 Sheets—Sheet 3.
A. J. SIMPSON.
GRAIN MEASURING APPARATUS.
No. 377,278. Patented Jan. 31, 1888.
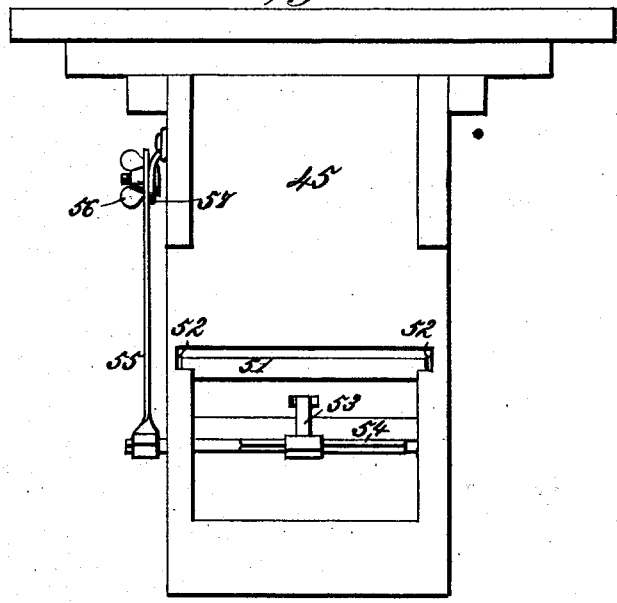
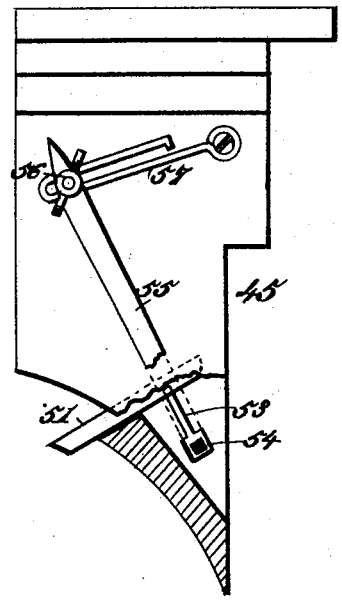
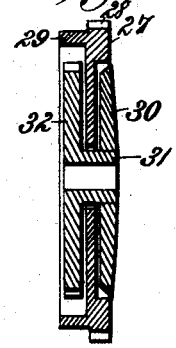
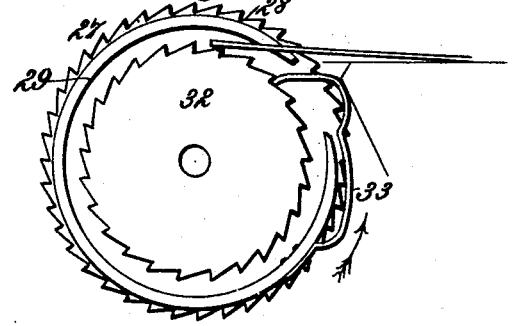
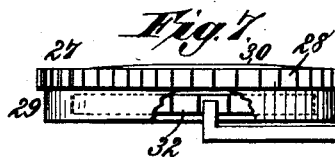
Witnesses.
Robert Everitt,
Dennis Sumby.
Inventor:
Andrew J. Simpson.
By James L. Norris,
Atty.

UNITED STATES PATENT OFFICE.

ANDREW J. SIMPSON, OF MORROW, OHIO.

GRAIN-MEASURING APPARATUS.

SPECIFICATION forming part of Letters Patent No. 377,278, dated January 31, 1888.

Application filed April 28, 1887. Serial No. 236,499. (No model.)

*To all whom it may concern:*

Be it known that I, ANDREW J. SIMPSON, a citizen of the United States, residing at Morrow, in the county of Warren and State of Ohio, have invented new and useful Improvements in Grain-Measuring Apparatus, of which the following is a specification.

My invention relates to grain-measuring apparatus of that type wherein a revolving measuring-wheel carrying grain-buckets operates a registering mechanism which indicates the quantity of grain passing through the scale.

It is the purpose of my invention to provide a mechanism having automatic action, whereby grain flowing into a hopper passes through a revolving measuring-wheel having buckets of a given capacity which receive the grain and a registering mechanism which is actuated by the measuring-wheel and whereby the weight or volume of grain passing through the measuring-wheel is accurately indicated.

It is the further purpose of my invention to provide novel and simple means whereby the rotation of the measuring-wheel is periodically arrested and its further movement prevented until such time as the bucket receiving the grain has been changed to the full extent of the unit of measurement, whereupon it is automatically released and a sufficient partial rotation allowed to secure the complete evacuation of said bucket, together with such rotary movement of the wheel as may be required for the operation of the registering mechanism.

It is my purpose, also, to provide simple means whereby the increment of weight is rendered variable, so that the accuracy of measurement can be at all times secured and under all circumstances.

It is also one purpose of my invention to so organize the mechanism that the grain may flow in a continuous stream through one and the same hopper without material interruption.

The invention consists in the several novel features of construction and new combinations of parts hereinafter fully set forth, and definitely pointed out in the claims.

Figure 1:
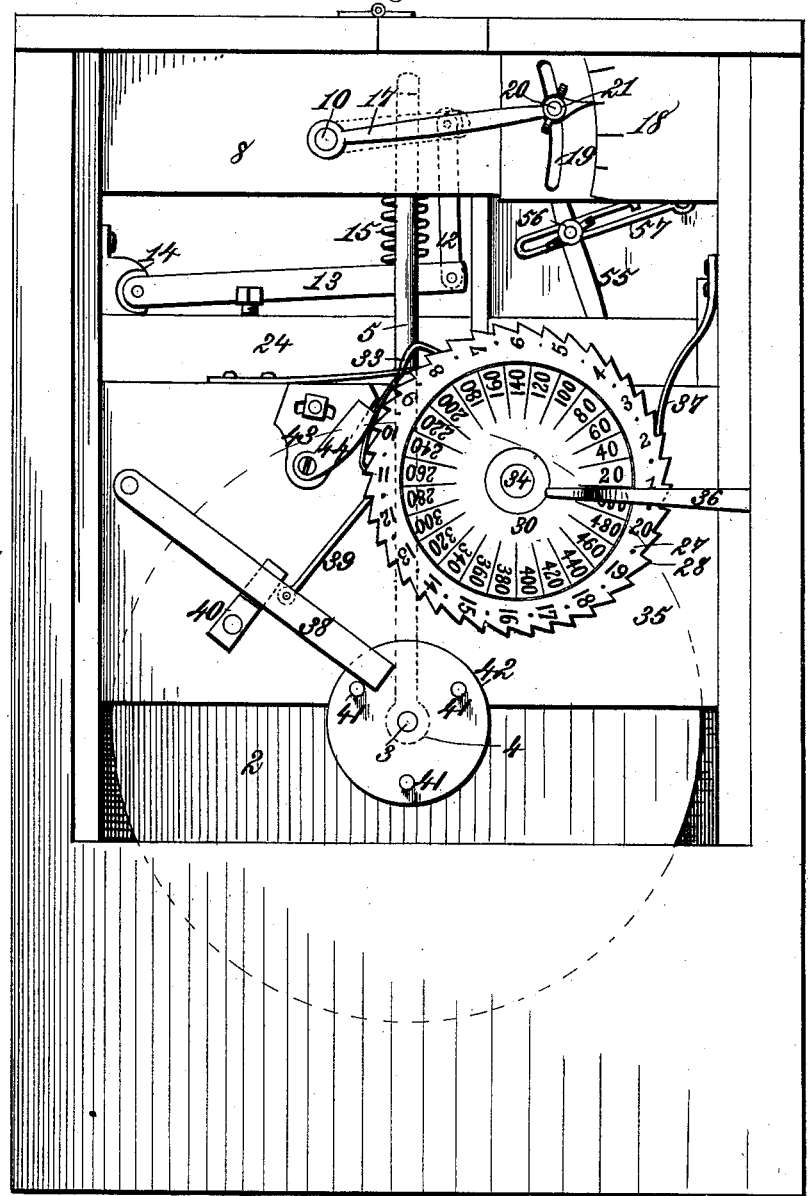
Figure 2:
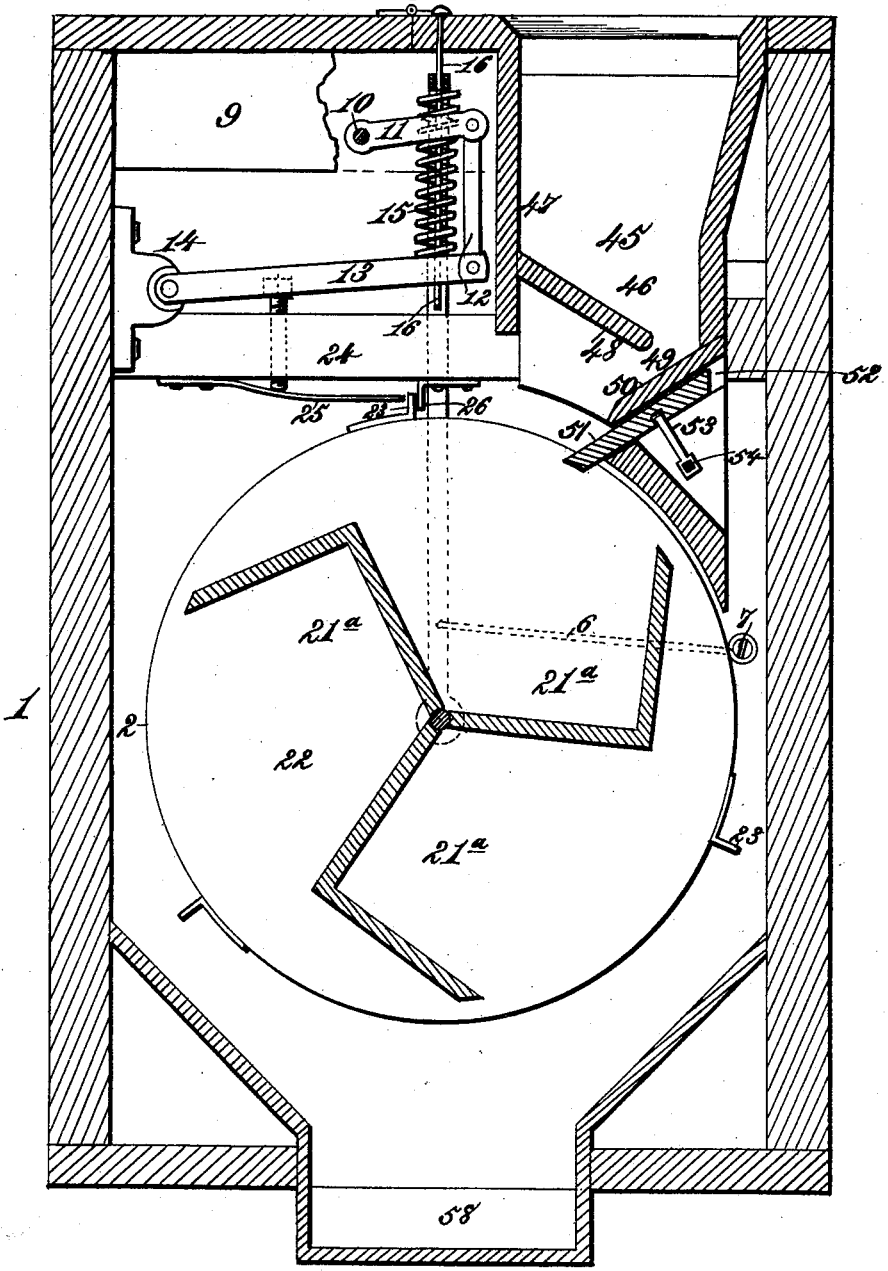

In the accompanying drawings, Figure 1 is a front elevation of the measuring apparatus with the wall of the casing removed. Fig. 2 is a vertical section at right angles to the axis of the measuring-wheel, showing the grain-buckets and the automatic stop mechanism. Fig. 3 is a side elevation of the hopper removed. Fig. 4 is a view partly in section and partly in elevation, showing the parts composing the hopper. Fig. 5 is a detail view of the registering mechanism. Fig. 6 is a detail view of the registering mechanism taken from the opposite side. Fig. 7 is a detail section of the same parts.

In the said drawings, the reference-numeral 1 designates a casing of any suitable form within which the operative parts are contained. Journaled within the same is a measuring-wheel, 2, rotating upon a shaft, 3. The journals of this shaft lie in eyes 4, formed upon the ends of a yoke, 5, which has vertical arrangement within the casing, and the lower end of this yoke is connected by means of arms 6 to the walls of the casing, to which said arms are pivotally connected by means of pins or screws 7. By this construction the yoke 5 is allowed a limited movement up and down, the lower end moving in the arc of a circle of which the arms 6 are radii.

Within the upper part of the casing are set rigid braces 8 and 9, in which a shaft, 10, is supported parallel with the axis of the measuring-wheel. Upon this shaft is rigidly mounted a crank-arm, 11, which lies just beneath the horizontal arm of the yoke 5. The end of the crank-arm 11 is connected by a link, 12, to an arm, 13, pivotally mounted in a bracket, 14, on the wall of the casing. Between the arm 13 and the yoke 5 is interposed a spiral spring, 15, held in place by a pin or rod, 16, which passes down through eyes in the said yoke and arm, respectively. By raising the end of the crank-arm 11 the pivoted arm 13 will be drawn up, and the spring 15 will be compressed against the yoke and will lift the latter with a force corresponding to the degree of compression of the spring.

Upon the outer end of the shaft 10 is mounted an arm, 17, the free end of which moves over a plate or tablet, 18, in which is cut a slot, 19, lying in the arc of a circle of which the arm 17 is the radius. Passing through the end of the said arm and through the slot 19 is a set-screw, 20, tapped into a nut, 21, which lies against the back of said plate. By loosening the screw the arm 17 may be adjusted up and down, and the crank-arm 11 will be correspondingly adjusted.

The measuring-wheel 2 is provided with three grain-buckets, 21ª, of equal size. These buckets are in cross-section of nearly the form of a trapezoid, with the longer side open to receive the grain.

Upon the disks 22, forming the circular heads of the measuring-wheel, are mounted teeth 23, and upon parallel braces 24, overhanging the said disks, are mounted springs 25, attached at one end only to said braces, and near the free ends of said springs are mounted rigid stops 26. The arrangement of these parts is such that if the measuring-wheel 2 is revolved, when the spring 15 is under sufficient tension to raise the yoke 5, the teeth 23 on the wheel-heads will strike the springs 25, forcing them up and then passing off the free ends of said springs, which are at once restored to their normal position. As the teeth 23 pass off the springs 25, they strike the stops 26 and arrest the further rotation of the measuring-wheel, retrograde movement of the latter being prevented by the ends of the said springs, which abut against the teeth 23. As the grain accumulates in the bucket of the measuring-wheel, the spring 15 is compressed by the gravity of the grain, which carries down the yoke 5 farther and farther as the weight of grain increases. As the weight reaches the maximum, the yoke 5 sinks so low as to drop the wheel 2 far enough to withdraw the teeth 23 from engagement with the stops 26, whereupon the wheel, being overloaded upon one side by the grain, instantly makes a partial revolution, bringing the next succeeding teeth into similar engagement with the springs 25 and stops 26, the revolution of the wheel at each release being sufficient to empty or practically empty the bucket.

The action of the apparatus being wholly automatic, a register is provided to indicate the amount of grain passing through the hopper. This register consists of an annulus, 27, having equal divisions on its face with an appropriate numerical designation. This annulus is toothed on its periphery 28, and is provided with a flange, 29, upon its back side. Within the annulus 27 is mounted a disk, 30, having its face flush with the face of said annulus and divided by radial lines into equal divisions, each one representing an equal number of the separate units of measurement noted upon the annulus. The shaft 31 of the disk 30 extends rearward, and upon its end is rigidly mounted a ratchet-wheel, 32, lying within the flange 29. Upon said flange is mounted a spring-pawl, 33, having its nose projecting through an opening in the flange, but normally out of contact with the ratchet-wheel 32. As the flange 29 moves with the annulus 27, it is evident that whenever the spring-pawl 33 is thrown inward far enough to engage the ratchet 32 the latter, and consequently the disk 30, will be compelled to rotate with said annulus as long as the engagement of the pawl continues.

The registering-annulus and disk are mounted upon a stud, 34, which projects from a plate, 35, in front of the measuring-wheel 2 and passes through the hollow shaft 31. A flat index-finger, 36, extends across the annulus and partly across the face of the disk 30, bearing upon the latter with sufficient friction to hold it at any point and prevent all tendency to displacement thereof due to the friction of the ratchet-wheel 32 on the rear face of the annulus or of the annulus on the edge of the disk. A holding-pawl, 37, engages with the toothed periphery 28 of the annulus after each advance.

Upon the plate 35 is pivotally mounted a pawl-carrying lever, 38, having a pawl, 39, pivotally mounted thereon. This lever drops by gravity until it is arrested by a block, 40, in which position its end lies in the path of a series of studs, 41, carried by a disk, 42, rigidly mounted on the shaft of the measuring-wheel 2. At each partial revolution of this wheel the end of the lever 38 is raised by one of these studs and the pawl 39 is reciprocated. This pawl rests upon the toothed periphery 28 of the annulus 27 and advances the latter a single step at each reciprocation of the lever.

Upon the face of the plate 35 is mounted a cam-block, 43, which lies near the periphery of the flange 29. This cam-block is adapted to act upon the back of the spring-pawl 33 and to throw its nose into engagement with the ratchet-wheel 32, by which the disk 30 is moved. The extent of surface of this cam-block is sufficient to insure an operative engagement between the said spring-pawl 33, carried by the flange 29, and the ratchet 32 during the time necessary to carry the disk 30 through a partial rotation sufficient to move one of its equal divisions past the index-finger 36. The cam-block 43 being rigid upon the plate 35, it will be seen that the disk 30 will be advanced a single step as each rotation of the annulus 27 is completed. Upon the cam-block 43 is mounted a guard-plate, 44, by which the vibrating pawl 37 is prevented from accidental contact with the flange 29 or the spring-pawl 33.

The grain is fed to the mechanism through a hopper, 45, which is preferably made in such manner that it may be easily and quickly detached from the casing 1. This hopper consists of a primary receptacle, 46, one wall of which is formed of a cross-plate, 47, which supports one end of the brace 9. At the bottom this receptacle terminates in an inclined plate, 48, adapted to conduct the grain away from the periphery of the measuring-wheel and deliver it to an opening, 49, whence the grain passes to an oppositely-inclined plate, 50, just beneath which lies an adjustable plate, 51, having a parallel inclination, and sliding in ways 52, formed in the vertical walls of the hopper. With this adjustable plate 51 an arm, 53, engages, said arm being rigidly mounted upon a rock-shaft, 54. A lever-arm, 55, on the end of this shaft serves to adjust the plate in the ways or grooves 52, said lever being held at any point by a set-screw, 56, which passes through a slotted arm, 57, on the hopper. This construction is for the purpose of enabling the plate 51 to be adjusted to a point corresponding to the rise of the wheel, so that the beveled edges of the partition-walls of the wheel by which the buckets are formed may pass the edge of the plate without obstruction, as shown in Fig. 2.

From the buckets of the wheel the grain passes to a duplex spout, 58, in which is placed a central wing, 59, pivotally mounted and turned by a hand-lever, 60, to close one or other of said spouts, the construction in this respect being similar to that heretofore used for a similar purpose.

What I claim is—

1. In a grain-meter, the combination, with a measuring-wheel having separate grain-buckets, of a yoke in which said wheel is journaled, a spring supporting the yoke, and a lever raising or lowering said spring to increase or decrease its tension on the yoke, the wheel-heads being provided with teeth, and the casing having stops engaging therewith, substantially as described.

2. In a grain-meter, the combination, with a measuring-wheel having intermittent rotary movement, of a registering mechanism consisting of an outer annulus, an inner disk on which said annulus turns, a vibrating lever having a pawl engaging with a ratchet on the outer annulus, a spring-pawl carried by a flange on said annulus and having its nose projecting through an opening in said flange, and a cam-block rigid on the casing with which said spring-pawl engages at each revolution of the annulus, the inner disk being provided with a ratchet, substantially as described.

3. In a grain-meter, the combination, with a grain-measuring wheel, of a yoke in which said wheel is journaled, a spring supporting said yoke, a rock-shaft having a crank-arm which is linked to a pivoted arm on which one end of the yoke-supporting spring rests, a lever rigid on the end of said rock-shaft, and means for fastening said lever at any point of adjustment, substantially as described.

4. In a grain-meter, the combination, with a measuring-wheel having separate grain-buckets, of a feeding-hopper having an upper rearwardly-inclined plate, an adjustable forwardly-inclined grain-plate below the same, a rock-shaft having an arm engaging the adjustable plate, a lever on the end of the rock-shaft, a set-screw passing through the end of said lever, a slotted arm in which said set-screw moves, and a turn-nut by which the lever may be locked at any point, substantially as described.

5. In a grain-meter, the combination, with a rotating measuring-wheel having a disk on its axis provided with studs, of a pivoted lever vibrated by said disk, a pawl carried by said lever, a toothed annulus with which said pawl engages, an inner toothed disk on which the annulus turns, a flat index having bearing on the face of the disk, a spring-pawl carried by the annulus and adapted to engage with the teeth of the disk, and a cam-block on the casing impinging at each revolution against the spring-pawl and throwing it into mesh with the disk, substantially as described.

In testimony whereof I affix my signature in presence of two witnesses.

ANDREW J. SIMPSON.

Witnesses:
FRANK BRANDON,
STEPHEN H. WATERS.